… … …

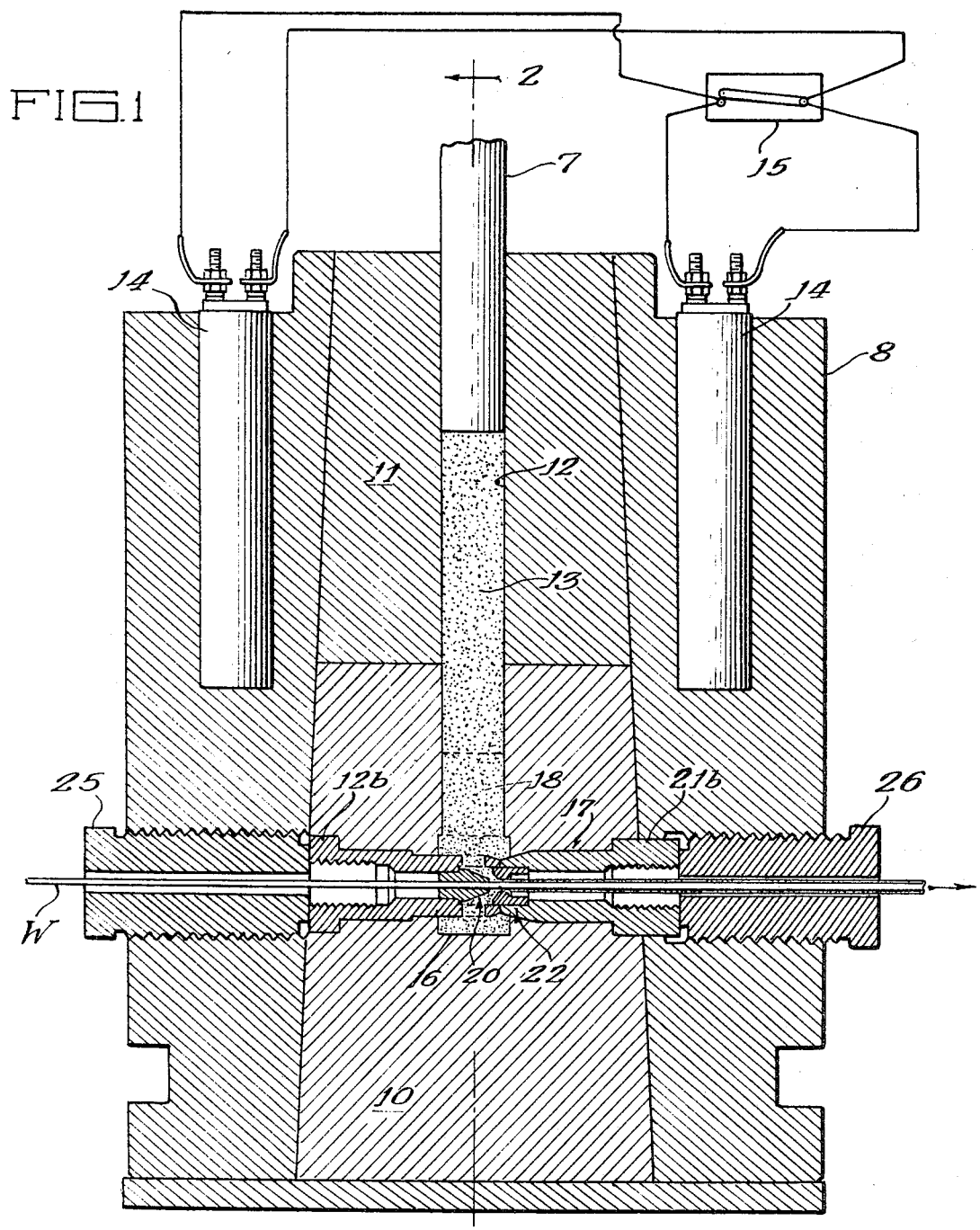

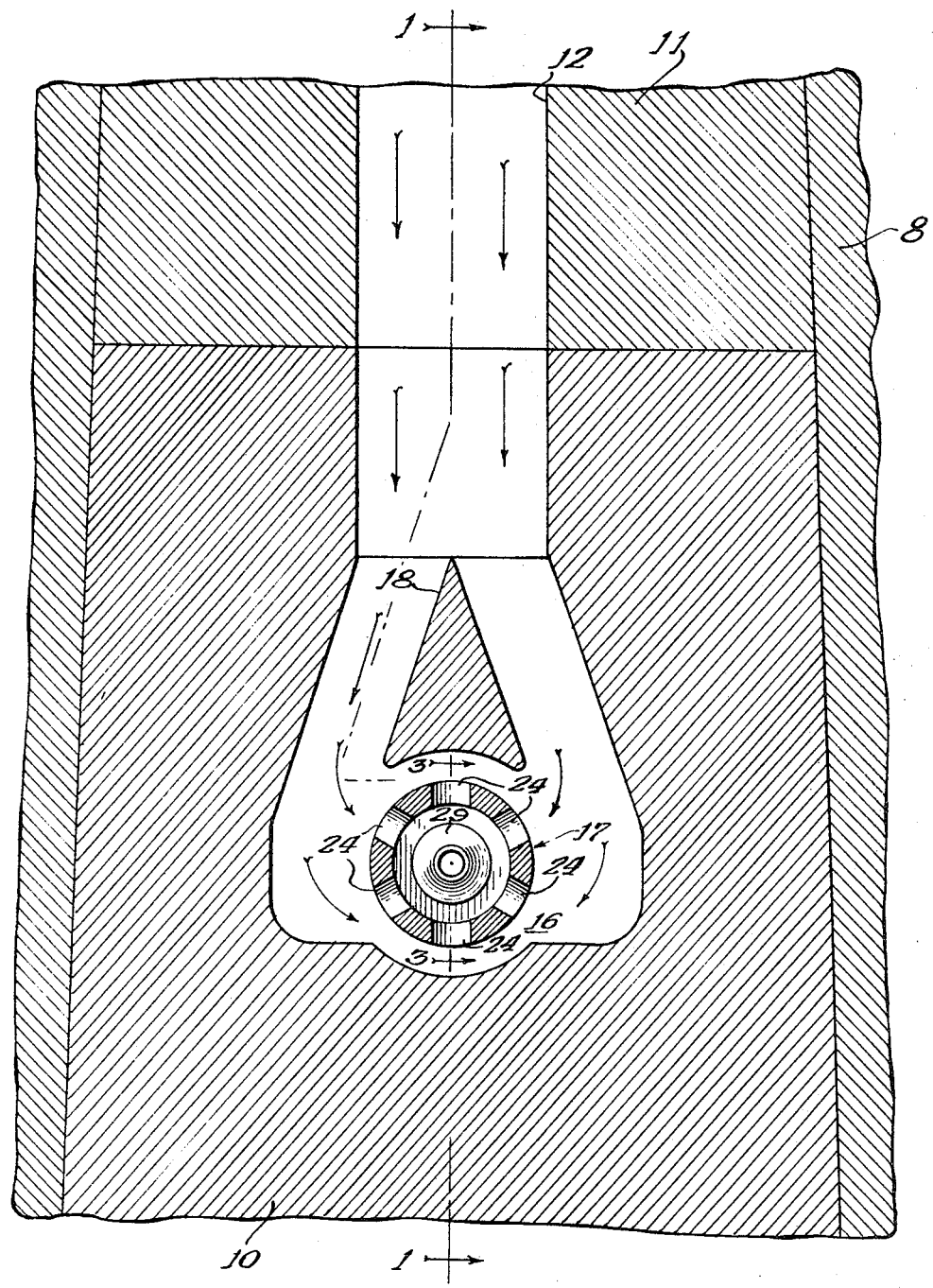

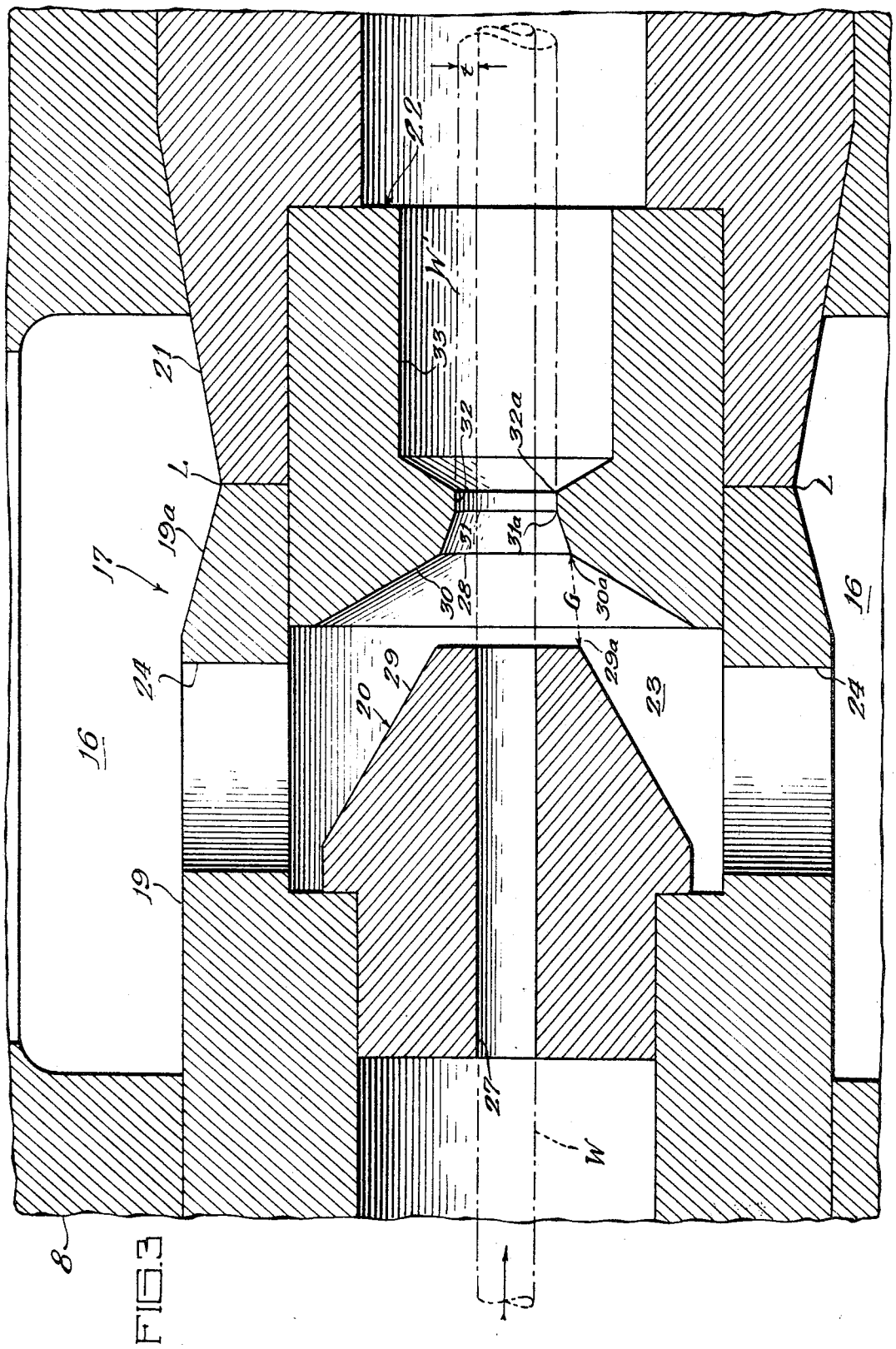

United States Patent Office 3,399,557
Patented Sept. 3, 1968

3,399,557
APPARATUS FOR EXTRUDING A RELATIVELY SOFT METAL SHEATH ONTO A HARD METAL WIRE
Ernest U. Lang and William F. Hope, Niles, Mich., assignors to National-Standard Company, a corporation of Delaware
Filed Nov. 1, 1965, Ser. No. 522,802
11 Claims. (Cl. 72—258)

ABSTRACT OF THE DISCLOSURE

Apparatus for cladding a ferrous metal core wire to produce a clad wire which may be drawn, by extruding and bonding to the core an aluminum sheath, in which the die head includes a male die and a female die spaced from one another and having adjacent frusto-conical surfaces that define a tapered annular soft metal flow guide which is concentric with the die axis, there being an entry guide in the male die in which a ferrous metal wire core is snugly guided concentric with the die axis as it enters the head, and a tapered compressing bore in the female die which is concentric with said axis and merges concentrically into an untapered die portion the diameter of which is equal to that of the finished wire.

---

The extrusion of a soft metal onto a steel wire with a firm bond between the extruded sheath and the steel core, and in particular, extrusion of a thick aluminum sheath onto a steel wire to produce an aluminum clad wire with a good bond between the steel and the aluminum, has heretofore not been accomplished at commercial rates of production.

Aluminum coated steel wire has many uses, particularly as electrical conductor wire to replace copper coated steel wire; but heretofore a satisfactory bond between the aluminum and the steel has been obtained only by hot dipping. Hot dipped aluminum coated steel wire is valueless as an electrical conductor because a brittle aluminum-iron alloy is formed which is a very poor conductor of electricity.

As far back as 1906 it was suggested in Patent 814,731 that apparatus could be provided for extruding aluminum onto a steel wire to provide an aluminum clad electrical conductor wire; but in spite of the obvious advantages of such material nobody up to the present time has successfully manufactured the material in commercial quantities. Extruding techniques and extruding dies which have been satisfactory for use with other materials have proved incapable of producing aluminum clad steel wire having satisfactory bond between the aluminum and the steel except at such a slow speed that the process is not commercially practical.

The apparatus disclosed in the present application produces an aluminum clad steel wire having a bond superior to that obtainable with conventional extruding apparatus, and is a factor of major importance in the successful production of aluminum clad steel wire under commercial operating conditions.

The apparatus is illustrated in a preferred embodiment in the accompanying drawings in which:

FIG. 1 is a vertical central longitudinal sectional view of a die carrier and die head constructed in accordance with the invention, together with a part of a conventional hydraulic press in which the die carrier is mounted, taken substantially as indicated along the line 1—1 of FIG. 2;

FIG. 2 is a fragmentary vertical transverse sectional view on an enlarged scale substantially as illustrated along the line 2—2 of FIG. 1; and FIG. 3 is a fragmentary transverse section through the extruding die, on an enlarged scale, taken substantially as illustrated along the line 3—3 of FIG. 2.

Referring to the drawings in greater detail, and referring first to FIG. 1, the present apparatus consists of a conventional hydraulic press (not shown) of 150 tons capacity, the piston of which is indicated as 7, in which is mounted a die head carrier 8 having a central cavity 9 to receive a die block 10 and an upper block 11. The die block is transversely bored to receive a die head assembly which is the subject of the present invention. In the blocks 10 and 11 are vertical bores providing a cavity 12 for a 1⅜ inch billet 13 of soft metal which may be pressed downwardly and extruded by the press piston 7. The pressure exerted by press piston 7 is controlled in the usual way to apply any desired pressure to the billet. Carrier 8 also has electric heating elements 14 wired through a conventional adjustable thermostatic control switch, indicated generally at 15, which controls the temperature of heating elements 14 to maintain the billet at a selected temperature. Conveniently a thermocouple for the switch is substantially in contact with the billet 13, although the same effect may be achieved with the thermocouple elsewhere in the carrier by adjusting to compensate for the location of the thermocouple.

An annular channel 16 communicates with the cavity 12 and with an extrusion die head assembly, indicated generally at 17, which is carried in the transverse bore in the die block 10. As seen in FIGS. 1 and 2, a flow diverter portion 18 is at the lower end of the cavity 12 and causes metal forced by the piston 7 to go around the die head assembly 17 in the annular channel 16.

The die head assembly is best seen in FIGS. 1 and 3 to include a male die holder 19 in which a male die 20 is press fitted, and a female die holder 21 in which a female die 22 is press fitted. The space between the dies provides an annular tapering metal flow guide 23 with which the annular channel 16 communicates through six entry holes 24 that extend through the male die holder 19 surrounding the male die 20. In order that certain dimensions of the entry guide 23 may be definitely fixed and unvarying, an outer end portion 19a of the male die holder 19 makes a snug sliding fit around the female die 22, and the inner ends of the two die holders 19 and 21 abut along a parting line L.

As seen in FIG. 1, the die holders 19 and 21 have flanges 19b and 21b, respectively, at their outer ends, and said flanges seat in recesses in the ends of the transverse bore. Die head assembly 17 is firmly clamped in the die head block 10 by threaded sleeves 25 and 26 which screw into threaded holes in the die head carrier 8 and bear on the flanges 19b and 21b, respectively.

Referring further to FIG. 3, the male die 20 has an axial entry bore 27 in which a wire W to be clad makes a snug sliding fit so that it will enter the female die 22 precisely on the axis of an extrusion bore 28 in the female die.

The tapered metal flow guide 23 is defined internally by a frusto-conical outer guide surface 29 of the male die and externally by a chamfered guide surface 30 of the female die. The angles illustrated in FIG. 3, and the lengths of the flow guide surfaces, are the optimum for a particular core wire diameter and sheath thickness, and must be changed to produce the best results with other wire and sheath thicknesses. The extrusion gap G from the edge 29a of the guide surface 29 to the edge 30a of the guide surface 30 is where the core wire W is subjected to the greatest pressure tending to pinch it off, so this space must be closely controlled; and it is for this reason that the die holders 19 and 21 abut against one another. If a .190″ steel wire is to be clad with a sheath of electrical conductivity grade aluminum .013″ thick, the extrusion gap G must be held between .08″ and .12″.

The internal guide surface 29 is at an angle of 30° to the horizontal, while the external guide surface 30 is at an angle of 30° to the vertical.

The entry for the extruded metal, through the annular passage 16 and the six spaced holes 24, produces a pressure differential between the exterior and the interior of the die head assembly that gives an even flow of aluminum from all sides.

Another important factor in the entry structure is that aluminum tends to form a black oxide along the die surfaces, and the oxide cannot bond satisfactorily to the core wire. The structure of the annular passage 16, entry holes 24, and into the converging annular guide 23, produces some turbulence in the aluminum which tends to break up any oxide film and disperse it through the body of aluminum where it is so diffused as to cause no bonding problems.

Billet 13 is forced by piston 7 through the annular channel 16, the entry holes 24 and the tapering flow guide 23, so that it concentrically surrounds wire W in the female die entry and is pressed into intimate contact with wire W in the die as the wire is pulled through the die by a capstan (not shown) so as to form an aluminum sheath S on the wire.

As seen in FIG. 3, the edge 30a of the chamfered surface 30 of the female die 22 defines the entry end of a tapered compressing bore 31 of the female die, and the section 31 merges at an edge 31a into a short, untapered die portion 32. The untapered portion has an exit edge 32a where the female die enlarges sharply into a clearance bore 33.

Certain dimensional characteristics of the female die 22 are critical in the production of a satisfactory aluminum clad steel wire. For convenience and ease of generalizing the dimensional characteristics, the thickness of the ultimate sheath S on the wire is used as a reference dimension, as indicated by the letter $t$ on FIGURE 3 of the drawing. It is obvious that the dimension $t$ is equal to the radius of the untapered portion 32 of the female die bore, minus the radius of core wire W.

At the entry 30a of the compressing bore 31 of the female die the thickness of the aluminum is equal to the radius of the entrance end 23 minus the radius of the wire.

The taper of the die in the compressing bore 31 should be not less than about ¼ inch per foot (an included angle between opposite sides of the bore of 1° 11′38″), and not more than about ⅝ inch per foot (an included angle between opposite sides of the bore of 2° 59′3″); so that practical limits are 1° 10′ and 3°. A standard taper pin reamer generates a taper of ¼ inch per foot.

The smaller taper is required for wires in which the cross-section of the wire after extrusion is about 20% to 30% aluminum; while the maximum taper is required for wires which are about 60% to 70% aluminum. As a matter of convenience the taper can be expressed by the formula:

$$\text{Taper (in./ft.)} = \frac{\text{percent Al by area}}{100}$$

The total length (L) of the tapered and untapered portions of the female die (from the edge 30a to the edge 32a) is expressed by the formula:

$$L = \frac{S\%}{10\%}t + 4t$$

where "S%" is the percentage of the cross-sectional area of the clad wire that is represented by the area of soft metal. The untapered portion 32 must be about 1½ $t$.

Applications of the total length formula are as follows:

Where S=20.

(1) $$L = \frac{20\%}{10\%}t + 4t = 6t$$

Where S=40.

(2) $$L = \frac{40\%}{10\%}t + 4t = 8t$$

Where S=60.

(3) $$L = \frac{60\%}{10\%}t + 4t = 10t$$

Any substantial variations of L from the formula values derived above will result in an unsatisfactory product.

The relatively small angle of flow guide 23 to the vertical, coupled with the very shallow taper of the extruding die, minimizes any feeding of the wire solely by reason of extrusion pressure, and it is clear that this would be so since the pressure is imparted at a relatively high angle to the surface of the wire and thus can impart little forward component of movement to the wire. The forward component of movement is supplied by the pull of the capstan.

In a typical coating operation performed in the apparatus here disclosed, a clean steel wire having a diameter of .125″ is provided with a sheath of electrical conductivity grade aluminum having at thickness $t$ of .013″. Such a wire has a cross-sectional area of .01787″, and about 34% of that area is aluminum. The aluminum billet 13 is heated to approximately 1015° F., and is subjected to an extruding pressure from piston 7 of about 50,000 to 70,000 lbs. per square inch. With variations in the type of aluminum and in the steel core, the temperatures may be varied from the above figure, and pressures may be used which are as high as about 125,000 lbs. per square inch on the billet.

One factor which makes a very strong bond of primary importance is that the extruding temperature draws the temper of the core wire; and in order to increase the tensile strength to the desired level, the wire must be cold worked after it is extruded. A very high stress is placed on the steel-aluminum interface by drawing, and this tends to break the bond and strip the aluminum from the core.

The foregoing detailed description is given for clearness of understanding only and no unnecessary limitations are to be understood therefrom, as some modifications will be obvious to those skilled in the art.

We claim:

1. In apparatus for cladding a ferrous metal core wire to produce a clad wire which may be drawn by extruding and bonding thereto an aluminum sheath of thickness $t$ which is S% of the cross-sectional area of the clad wire, a die head comprising: a male die and a female die spaced from one another and having adjacent frustoconical surfaces that define a tapered annular soft metal flow guide which is concentric with the die axis, there being an entry guide in the male die in which a ferrous metal wire core is snugly guided concentric with the die axis as it enters the head, and a tapered compressing bore in the female die which is concentric with said axis and merges concentrically into an untapered die portion the diameter of which is equal to that of the finished wire, the combined length of the tapered compressing bore and the untapered die portion being about S%/10%$t$+4$t$.

2. The apparatus of claim 1 in which the included angle of the tapered compressing bore in inches per foot is about S%/100%.

3. The apparatus of claim 2 in which the length of the untapered female die portion is about 1½ $t$.

4. The apparatus of claim 1 in which the length of the untapered female die portion is about 1½ $t$.

5. Apparatus for cladding a ferrous metal core wire to produce a clad wire which may be drawn, by extruding and bonding thereto an aluminum sheath of thickness $t$ which is S% of the cross-sectional area of the clad wire, said apparatus comprising, in combination:

a die head carrier having a cavity to receive a billet of soft metal; means associated with said carrier for maintaining a billet in said cavity at a predetermined high temperature which is below its melting point; an annular soft metal flow channel communicating with said cavity;

a die head assembly in said carrier, said assembly including a tubular male die holder which has a plurality of radial entry holes communicating with said annular flow channel, a male die fixedly secured in said male die holder, said male die having a wire guide bore on the axis of the die head assembly and having a frusto-conical outer surface spaced radially inwardly from said entry holes and concentric with the guide bore, a tubular female die holder, a female die fixedly secured in said female die holder, said female die having a chamfered surface in spaced relationship to the frusto-conical surface of the male die and cooperating therewith to provide a tapered, annular metal flow guide which is concentric with the axis of the die head assembly, said chamfered surface merging into a tapered compressing bore, said compressing bore merging into an untapered female die portion the diameter of which is that of the clad wire, and means in said die head for maintaining a predetermined space between said male die and said female die;

and means associated with the die head carrier for forcing soft metal from the billet into the annular, metal flow guide under high pressure.

6. The combination of claim 5 in which the female die projects from one end of the female die holder, an end portion of the male die holder makes a snug sliding fit on the projecting portion of the female die, and the male and female die holders are in end abutting relationship to maintain the predetermined space between the male die and the female die.

7. The combination of claim 5 in which the total length of the compressing bore and the untapered portion of the female die is about $S\%/10\%\ t+4t$.

8. The combination of claim 7 in which the included angle of the tapered compressing bore is about $S\%/100\%$.

9. The combination of claim 8 in which the length of the untapered female die portion is about $1\frac{1}{2}\ t$.

10. The combination of claim 5 in which the included angle of the tapered compressing bore is about $S\%/100\%$.

11. Apparatus for cladding a hard metal core wire by extruding and bonding thereto a soft metal sheath, substantially as shown and described.

References Cited
UNITED STATES PATENTS

| | | | |
|---|---|---|---|
| 355,844 | 1/1887 | Sloan | 72—259 |
| 814,731 | 3/1906 | Robertson | 72—259 |
| 1,975,455 | 10/1934 | Hanff | 72—268 |
| 2,731,144 | 1/1956 | Dreyer | 72—259 |

OTHER REFERENCES
German printed application, 1,111,586, July 1961.

CHARLES W. LANHAM, *Primary Examiner.*

K. C. DECKER, *Assistant Examiner.*